United States Patent
Buis

(10) Patent No.: US 10,578,042 B2
(45) Date of Patent: Mar. 3, 2020

(54) HANDLE-OPERATED AUTOMATIC START AND STOP FOR MARINE ENGINE

(71) Applicant: Pleasurecraft Marine Engine Company, Little Mountain, SC (US)

(72) Inventor: Carver Buis, Chapin, SC (US)

(73) Assignee: Pleasurecraft Marine Engine Group, Little Mountain, SC (US)

( * ) Notice: Subject to any disclaimer, the term of this patent is extended or adjusted under 35 U.S.C. 154(b) by 72 days.

(21) Appl. No.: 15/968,296

(22) Filed: May 1, 2018

(65) Prior Publication Data
US 2019/0338718 A1 Nov. 7, 2019

(51) Int. Cl.
*F02D 41/22* (2006.01)
*B63H 21/21* (2006.01)
*F02N 11/08* (2006.01)
*F16H 59/02* (2006.01)
*F16H 61/02* (2006.01)

(52) U.S. Cl.
CPC ........... *F02D 41/22* (2013.01); *B63H 21/213* (2013.01); *F02N 11/08* (2013.01); *F16H 59/02* (2013.01); *F16H 61/0204* (2013.01); *B63H 2021/216* (2013.01); *F02D 2041/228* (2013.01); *F02D 2200/021* (2013.01); *F02D 2200/101* (2013.01)

(58) Field of Classification Search
USPC ........................................................ 477/111
See application file for complete search history.

(56) References Cited

U.S. PATENT DOCUMENTS

| | | | |
|---|---|---|---|
| 2,867,132 A | 1/1959 | Schroeder | |
| 4,192,279 A | 3/1980 | Maisch et al. | |
| 4,454,843 A | 6/1984 | Uchida et al. | |
| 4,817,466 A | 4/1989 | Kawamura et al. | |
| 5,653,659 A * | 8/1997 | Kunibe | B60W 10/02 477/110 |
| 7,036,477 B1 | 5/2006 | Thompson et al. | |
| 7,497,141 B2 * | 3/2009 | Cho | F02N 11/103 74/335 |
| 8,406,944 B2 | 3/2013 | Garon et al. | |
| 8,414,455 B2 * | 4/2013 | McCullough | B60R 25/02 477/106 |
| 8,548,645 B2 | 10/2013 | Long | |
| 9,638,114 B2 | 5/2017 | Yamaguchi | |
| 9,896,178 B1 * | 2/2018 | Przybyl | B63H 21/213 |
| 9,994,222 B2 * | 6/2018 | Khafagy | B60W 10/06 |
| 10,036,340 B2 * | 7/2018 | Nishimura | F02D 41/0225 |
| 2017/0107925 A1 | 4/2017 | Sutton | |

\* cited by examiner

*Primary Examiner* — Dirk Wright
(74) *Attorney, Agent, or Firm* — Metz Lewis Brodman Must O'Keefe LLC

(57) ABSTRACT

A system for automatically starting and stopping engine(s) of a vessel based on the position of a handle. Movement of the handle out of neutral initiates the automatic starting of the engine(s) by an ECM. Movement of the handle into neutral initiates the automatic stopping of the engine(s), which may also require certain other prerequisite conditions. An ECM is in electrical communication with the engine(s), transmission, battery, initializer, starter, and various sensors providing information on the position of the handle and other conditions including engine speed, temperature, transmission speed, vessel speed and battery voltage. The ECM includes memory and processor(s), and is configured to receive information from the various sensors and operative components of the vessel and determine when to initiate automatic start and stop of the engine(s) based on thereon.

18 Claims, 9 Drawing Sheets

HANDLE-OPERATED AUTOMATIC START AND STOP FOR MARINE ENGINE

FIELD OF THE INVENTION

This invention relates to systems for automatically starting and stopping an engine(s), and more particularly, to systems for automatically starting and stopping a marine engine(s) based on the position of the handle with respect to out-of-gear neutral.

BACKGROUND

Vehicles operated by internal combustion engines, such as cars and boats, have long used ignition for starting and stopping of the engine. Traditionally, ignition has required the turning of a key or pressing a button to initialize the firing process to start the engine, and then to cut the power to vehicle so the engine stops.

Recent developments in the automotive industry have led to technology that automatically turns the engine off when the car idles, such as at stop lights, to save fuel and energy and be more environmentally friendly. Similarly, some cars also include technology that turns the engine on automatically when the clutch and/or gas pedal is depressed (in manual transmission cars) or by releasing the brake (in automatic transmission cars), either of which may initiate the fuel injection process. Additional circumstances may be taken into account, such as the engine speed, transmission gear and/or speed, engine or coolant temperature, battery life, pedal positions (such as the gas pedal controlling fuel input or the clutch pedal controlling connection between the engine and transmission), and time intervals to account for stop-and-go traffic. Such considerations are made to allow the automatic starting and stopping of an engine to occur only when conditions are appropriate, such as to be able to distinguish between braking to reduce speed and braking at a stop light. Parameters for such considerations may be programmed into an electronic control unit (ECU) that electrically operates the various components of the vehicle.

Some marine vessels also include a system that controls automatic starting or stopping of a marine engine. For instance, U.S. Pat. No. 8,406,944 to Garon discloses a system for multiplexed engines that protects against unwanted starts. Sensors are provided in the engine and at the throttle handle to provide positional and operative information. The system permits automatic electronic starting of the engine only when both the engine and the control shift (i.e., throttle handle) are in the neutral position. This is consistent with other industry standards in which the throttle must be in neutral in order to start the engine. Such systems are therefore directed to controlling when engine start may occur by limiting it to a certain narrow window—when in neutral. This was largely seen as necessary for safety reasons.

However, these systems are restrictive in that they do not allow for ease of automatic starting or quick starting of engine(s), particularly in a marine setting. What is needed is a system that provides for quickly and automatically starting an engine(s), and doing so safely. Further systems for automatic shut-down of the engine(s) would also be beneficial, particularly in the marine setting.

SUMMARY OF THE INVENTION

A system is disclosed for controlling the starting and stopping of engine(s) in vessels such as marine vessels, and specifically for automatically starting and stopping engine(s) based on the position of the handle with respect to the neutral position. Automatic starting of the engine(s) is enabled by any movement of the handle out of neutral. This is expressly contrary to how current marine vessels operate, which specifically requires the handle to remain in neutral for engine start to occur. It is also distinct from other known automatic start systems, which use the movement of a gas pedal or clutch to initiate engine start, and therefore require the transmission to already be in gear for automatic engine start.

The system of the present invention is also configured to automatically stop the engine(s) based on movement of the handle back into neutral. This may occur directly upon movement of the handle into the neutral position, or additional conditions may be required before the automatic shutdown of the engine(s). For instance, the system may require that (1) the transmission speed be below a transmission threshold, to indicate the transmission is substantially not moving; (2) the vessel speed be below the vessel speed threshold, to indicate the vessel is substantially stopped in motion; (3) the engine temperature is at least at a temperature threshold, to indicate the engine is sufficiently warmed and lubricated to permit a restart of the engine; (4) the battery has a charge of at least a voltage threshold, to indicate the battery is sufficiently charged to allow restart of the engine; (5) there is no check engine light on, to indicate there are no engine malfunctions which would prevent restart; and (6) expiration of a shutdown timer triggered once the above conditions are met. The automatic shut-down process may require any or all the above conditions before stopping the engine(s).

The system includes a number of components that allows for the automatic starting and stopping of engines as described above. For instance, the system includes an electronic control module (ECM) that is in electrical communication with the other various system components, and which receives information and signals and sends instructions, commands and polls for information from the various other system components. The ECM is also configurable to set various thresholds for information, such as transmission threshold, vessel speed threshold, temperature threshold, and voltage threshold. The ECM therefore includes memory, processor(s), circuitry, logic and other necessary capabilities for controlling the automatic start and stop processes.

The system further includes at least one handle sensor in proximity to a handle of the vessel, which may be a throttle handle or joystick. The handle sensor(s) identifies the location of the handle in various positions, including neutral as well as those other than neutral. There may be multiple handle sensors to provide redundancy in the event of failure of one sensor, or which may be specific to distinct positions. These handle sensors provide the positional information to the ECM for initiating automatic start or stop procedures.

The system may also include the engine, transmission, battery and other components of the vessel used in the operation of the vessel. Sensors that provide information of the status of the various components, such as temperature, speed and position, may also be included and provide information to the ECM which it may use in automatically starting and stopping the engine(s).

The system can be used in marine vessels as well as non-marine vessels such as automobiles and other engine-operated vehicles. The use of the term "vessel" should not therefore be limited to marine craft. Further, the system can control the automatic starting and stopping of any number of engines, which may be controlled separately and independently from one another or collectively in tandem with one another. Accordingly, the system may be used in outboard, inboard and stern drive boats.

The system for automatic start and stop of an engine as described here provides several benefits. First, a boat or other recreational marine vessel typically has a useful life of about 1000 hours. Roughly half of this time is spent idling. With the automatic start and stop system as described here, the useful life of a marine vessel can be significantly increased by reducing or eliminating the time spent at idle. This translates into exponentially higher returns in potential trade-in or resale value of the vessel due to less wear and tear on the ECM, engine, transmission, and associated components such as fuel pumps. Automatic stops also provide a safety feature for skiers and people in and around the boat. By turning off the engine while stopped, the chance of injury getting into or out of the boat, and simply being in the water surrounding the boat, is significantly reduced. Finally, the automatic start and stop feature reduces the amount of gas or fuel used, which is both economical and environmentally beneficial since reducing the time the engine is idling reduces the amount of pollutants released into the air.

The system, together with its particular features and advantages, will become more apparent from the following detailed description and with reference to the appended drawings.

DESCRIPTION OF THE DRAWINGS

Like reference numerals refer to like parts throughout the several views of the drawings.

DETAILED DESCRIPTION

Figure 1:
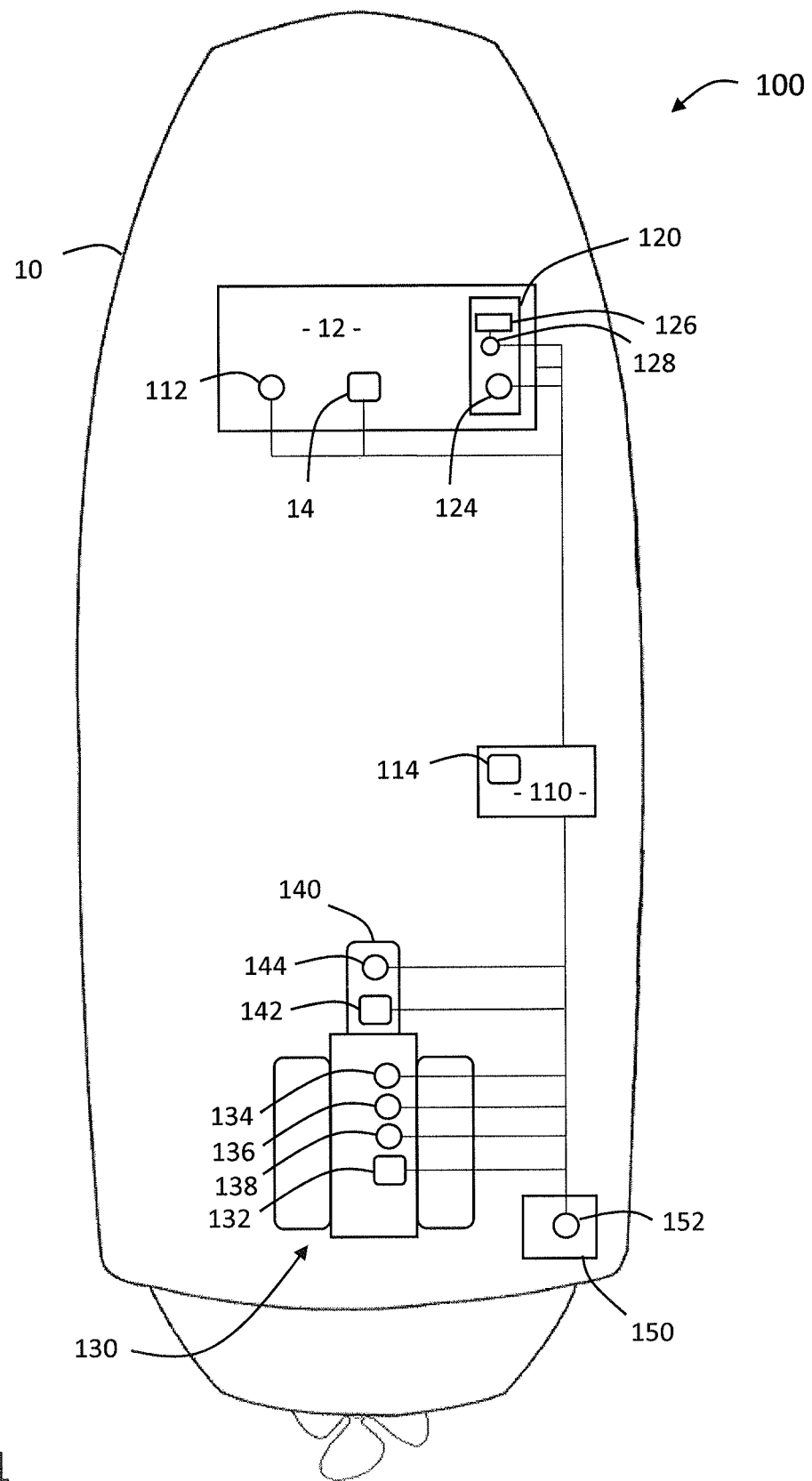
FIG. 1 is a schematic diagram of one embodiment of the present system for controlling automatic start and stop of an engine in a vessel.

As shown in the accompanying drawings, and with particular reference to FIG. 1, the present invention is directed to a system 100 for automatically starting and stopping an engine(s) 130 of a marine vessel 10 based on the position of the handle 120 with respect to the neutral position. The vessel 10 may be any type of vehicle or vessel, such as but not limited to marine craft such as boats. The vessel may be recreational or commercial in nature.

Central to the system 100 is an electronic control module (ECM) 110, which may have memory be preconfigured or field-programmable with preselected values, thresholds, instructions, and operative programs to address and electronically control the various operating parameters of the system components through the logic circuits. Accordingly, the ECM 110 is in electrical communication with the various components of the system 100 described in greater detail below. As used herein, the terms "electronic communication" and "electrical communication" may be used interchangeably. The ECM 110 includes logic circuitry, such as but not limited to logic gates, configurable inputs, outputs, resistors and other circuitry and/or processor components for receiving and processing electrical information, polling and providing instructions to various system components as described below. For instance, the ECM 110 may include configured outputs that are activated, opened, turned to 1, or otherwise turned on when the ECM 110 receives signals from the various components and sensors discussed below. Further, the ECM 110 may operate the vessel 10 overall, or may be specific to the engine and/or transmission. For instance, the ECM 110 may be the engine control unit (ECU), transmission control unit (TCU), or may be a distinct component from, but in electrical communication with, either or both the ECU or TCU. For the sake of clarity, the present disclosure will reference the ECM 110 when discussing the present system 100.

Figure 2:
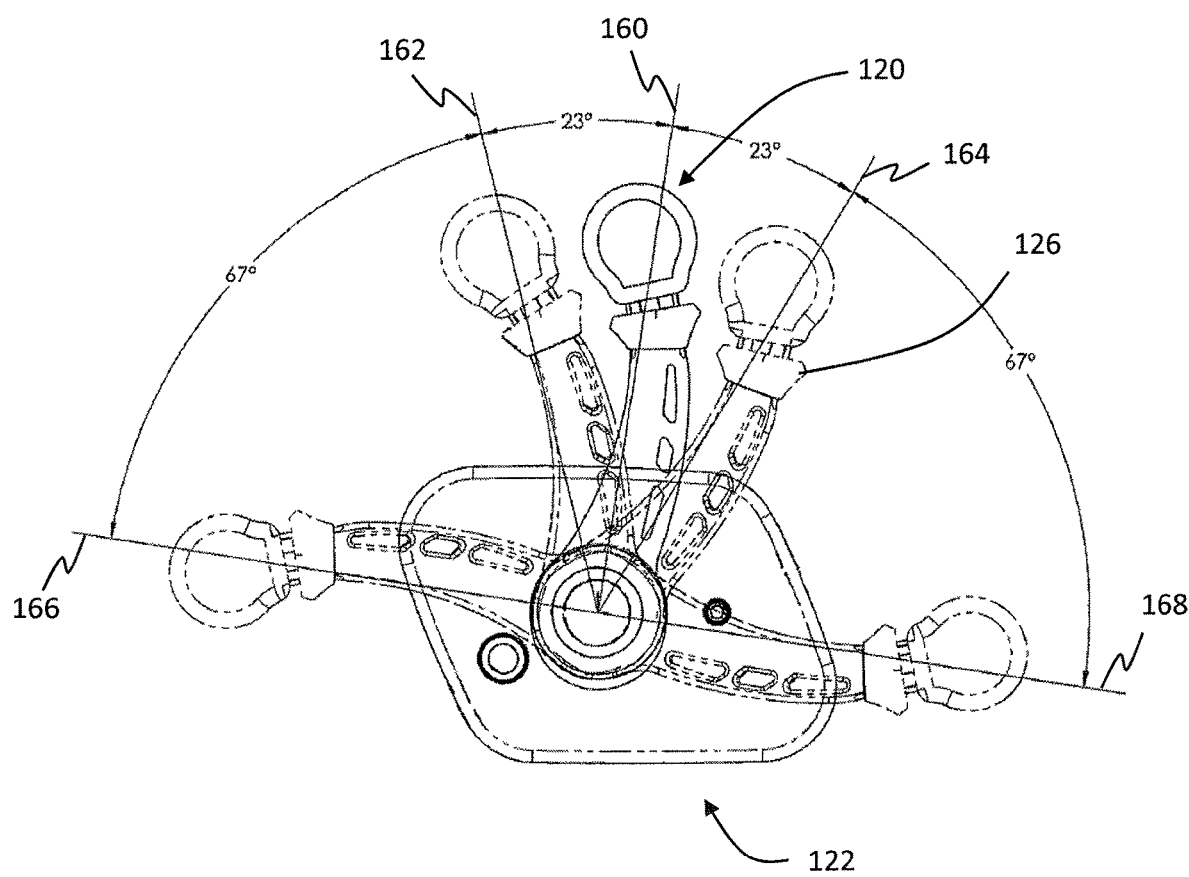
FIG. 2 is a schematic diagram of one example of a handle for controlling the automatic start and stop system of the present invention and the various positions thereof.

The system 100 further includes a handle 120 which is actuatable by an operator of the vessel to vary the speed and direction of the vessel. In at least one embodiment, the handle 120 may be a throttle handle, such as depicted in FIG. 2, which controls the direction and speed of the vessel. FIG. 2 shows a throttle handle movable in forward and reverse directions for movement between the neutral 160, forward idle 162, forward wide-open throttle (WOT) 166, reverse idle 164, and reverse WOT 168 positions. For the avoidance of doubt, "neutral position" as used here refers to the position corresponding to an out-of-gear position in which the transmission is not in gear. Accordingly, the neutral position 160 may also refer to an out of gear idle position, whereas the forward idle position 162 and reverse idle positions 164 may refer to in-gear idle positions. It should be noted that FIG. 2 is but one exemplary embodiment, showing idle positions 162, 164 located 23 radial degrees from neutral 160, and WOT positions 166, 168 at 67 radial degrees from the idle positions 162, 164. In other embodiments, the neutral 160, forward idle 162, forward wide-open throttle (WOT) 166, reverse idle 164, and reverse WOT 168 positions may be set to any desired distance, radial degree, or angle from any of the other positions, and any position may be used as the reference position. For instance, the forward idle 162 may be configured to be at any preselected position between neutral 160 and the forward WOT 166. Similarly, the reverse idle 164 may be configured to be at any preselected position between neutral 160 and reverse WOT 168. It should also be noted that the handle 120 may be movable at any percentage or increment between the various positions 160, 162, 164, 166, 168. Such movement may preferably be continuous along the full range of motion, although in other embodiments the handle 120 may be movable to discrete positions there along.

In at least one other embodiment, the handle 120 may be a joystick, such as are commonly found in marine vessels. Unlike a throttle handle that is movable only along a single plane, a joystick is movable through 360 degrees, and may be moved continuously or discreetly through the full range of motion to access the various positions 160, 162, 164, 166, 168. In at least one embodiment, neutral 160 is located with the joystick normal to the surface of the dash 12. A joystick may be used to control transmission selection of direction of movement, engine speed, as well as the angle or direction of an outboard motor. Accordingly, a joystick may be used for finer movements, such as docking and maneuverability at low speeds, whereas a throttle handle may be used for general operations and high-speed maneuverability. Many marine vessels include both a throttle handle and joystick, and may include one of each for each engine present in the vessel, which may be operated independently or in tandem. In the current system 100, either or both the throttle handle and joystick may be considered the handle 120. In still other embodiments, the handle 120 may be digital, such as may be presented in a visual display on the dash 12 and actuated by touching a soft key, touchpad or screen of a display to control the direction and speed of the vessel. In further embodiments, the handle 120 may be a button such as may be physically depressed to move between positions.

The handle 120 may be included as part of a larger handle assembly 122, as shown in FIG. 2. The handle assembly 122 includes the handle 120 as well as mounting hardware to secure the handle 120 to the dash 12 or other suitable part of the vessel. The mounting hardware may include plates, shafts, connectors, pins, and other similar hardware. The system 100 also includes at least one handle sensor 124 located in the handle assembly 122 and/or at the handle 120. For instance, a handle sensor 124 may be located at each of the neutral 160, forward idle 162, reverse idle 164, forward WOT 166, and reverse WOT 168 positions, and any position therebetween. In other embodiments, the handle sensor(s) 124 may be located at the pivot point or base of the handle 120, and may detect the position and change in position of the handle 120 by detecting a change in voltage resulting from such movement. Accordingly, the handle sensor(s) 124 may be any suitable sensor, such as but not limited to Hall effect, inductive, magnetoresistive, electromagnetic and potentiometer type sensors. The handle sensor(s) 124 may be contact-based or non-contact based, active or passive, and may employ physical switches, voltage or electrical current to detect the position and change in position of the handle 120. Any number and combination or type of handle sensor(s) 124 may be included in the system 100. The handle sensor 124 is in electrical communication with the ECM 110 and is configured to provide information, such as a signal(s) to the ECM when certain events are detected that indicate the status or position of the handle 120. This information may be transmitted as an electrical signal, such as voltage or electrical current.

The handle assembly 122 may also include a safety mechanism 126, as depicted in FIGS. 1 and 2. The safety mechanism 126 may be physically or electronically connected to the handle 120 and restricts the handle 120 from moving into or out of a preselected position. For instance, in at least one embodiment, the safety mechanism 126 may include an umbrella switch as depicted in FIG. 2 that is connected to the handle 120 and prevents the handle 120 from leaving the neutral position 160. To accomplish this, the umbrella switch may be connected to a spring-biased shaft that holds a ball bearing in place within the handle 120. When the umbrella switch is lifted, it is moved in a distal direction toward the outer knob of the handle 120. The connected shaft is pulled away from the ball bearing as the umbrella switch is lifted, which frees the ball bearing from a detent within the handle assembly 122 where it typically resides. With the ball bearing no longer being restricted in the detent, the handle 120 is now free to move in the forward or reverse direction. The detent and ball bearing may be located at any position within the handle assembly 122 to lock the handle 120 in any position, but in at least one embodiment are located so as to lock the handle 120 in the neutral position 160. It should be appreciated that this is just one example of a safety mechanism 126, and that any form of safety mechanism 126 that restricts movement of the handle 120 out of a preselected position may be used in the system 100. For instance, in other embodiments the safety mechanism 126 may be electrical and may be operated through interaction with a touch screen such as displayed at the dash 12.

In some embodiments, a safety sensor 128 may be located in proximity to the safety mechanism 126 and detects the state of the safety mechanism 126. The safety sensor 128 may be any suitable type of sensor, such as those described above for the handle sensor 124. The safety sensor 128 may also be in electrical communication with the ECM 110 and is configured to transmit signal(s) to the ECM regarding the position or status of the safety mechanism 126. This safety mechanism 126 status information may be needed in some embodiments before the engine 130 is permitted to start. In other embodiments, information from the safety sensor 128 may not be needed; the movement of the handle 120 out of the locked position may be sufficient for the system 100.

As shown in FIG. 1, the system 100 may also include an initializer 14 to activate or deactivate the electrical components of the vessel, such as but not limited to the ECM. Accordingly, the initializer 14 is in electrical communication with the ECM 110 and other electrical components of the vessel 10. In some embodiments, the initializer 14 may be a button or switch located on or near the dash 12 of the vessel 10, or may be located elsewhere. The initializer 14 may be pressed, pushed, turned, flipped, rotated, touched, or otherwise actuated to activate and deactivate the electrical circuits of the vessel 10. In other embodiments, the initializer 14 may be an area of a touchscreen or other soft key presented on a display, such as at the dash 12, that can be touched or pressed to activate the electrical circuit(s) of the vessel 10. The initializer 14 may be actuated any number of times to initialize various electrical circuits of the vessel 10. For instance, the initializer 14 may be actuated once to initialize the electrical components of the dash 12, such as the display and lights, and actuated another time to initialize the ignition circuit of the engine 130. Because the initializer 14 is in electrical communication with the ECM 110, the ECM 110 registers or is otherwise aware of when the various electrical circuit(s) are activated as they come online.

The system 100 also includes any number of engine(s) 130, each in electrical communication with the ECM 110. For instance, in at least one embodiment the system 100 includes a single engine 130, as shown in FIG. 1. In other embodiments, the system 100 may include multiple engines 130, such as in the range of 2-6 engines or more. When multiple engines 130 are used, each may be operated independently and coordinated by the ECM 110 to achieve a desired effect. The multiple engines 130 may also be operated together, such as each receiving the same instructions or with master and slave designations where one engine 130 is designated the master that receives the commands from the ECM 110 and the remaining engines 130 are slaves set to mirror the actions taken by the master engine 130. The engines 130 may be marine or marinized engines 130, and may include inboard, outboard, sterndrive, or any other type of motor or engine suitable for watercraft. In some embodiments, each engine 130 may have its own dedicated ECM 110, where one ECM 110 may be designated as the master that receives and processes information and provides instructions, with the other ECMs 110 configured as slaves that mirror the actions of the master. In other embodiments, the system includes one ECM 110 that controls the various engines 130.

Each engine 130 includes a starter 132 and various sensors 134, 136, 138 in electrical communication with the ECM 110. The ECM 110 is configured to send and receive information from each of the starter 132 and various sensors 134, 136, 138 in connection with automatically starting and stopping the engine 130. For instance, in at least one embodiment the starter 132 may be a starter as commonly understood for marine engines. In other embodiments the starter 132 may be spark plugs, the fuel injector, or control valves in relation to the fuel injector, or other component(s) that could receive instructions involved in the starting, cranking, or turning over of the engine 130. In certain embodiments, the starter 132 may be a component of an ECU separate from the ECM 110.

The engine(s) 130 may also include an engine speed sensor 134 such as a tachometer that measures or detects the speed at which the engine 130 is operating. The engine speed sensor 134 may detect and report on the engine speed in revolutions per minute (rpm) in at least one embodiment, though other suitable units of measurement are also contemplated.

The engine(s) 130 may also include a temperature sensor 136 that is positioned and configured to detect the temperature of the engine(s), such as by measuring the temperature of the engine coolant. The temperature sensor 136 may be capable of measuring any temperature in the operative and inoperative ranges of the engine 130, which may be measured in degrees Fahrenheit, Celsius or Kelvin. For instance, most internal combustion engines operate in the range of 195-220° F., so the temperature sensor 136 may be capable of detecting or measuring temperatures of up to 250° F. Further, the temperature sensor 136 may be located or positioned anywhere relative to the engine 130 that permits accurate temperature detection thereof, such as but not limited to in the engine coolant passage where a temperature probe may be contacting the engine coolant. For instance, in other embodiments the temperature sensor 136 may be an infrared (IR) thermometer positioned to shine a beam of IR light onto the surface of an engine component, such as the cylinder block, water manifold, or exterior of the engine to determine the temperature. In other embodiments, the temperature may be determined by the ECM 110 which utilizes information on inlet air temperature, oxygen levels, and air and oxygen mixture ratios to estimate the engine coolant temperature. Accordingly, the temperature sensor 136 may reside in the ECM 110, where auxiliary temperature sensor(s) are used to measure the inlet air temperature.

The temperature sensor 136 may be any suitable sensor capable of measuring temperature. For example, in some embodiments the temperature sensor 136 may be a negative temperature coefficient (NTC) sensor in which the internal resistance decreases as the temperature rises. In other embodiments, the temperature sensor 136 may be a positive temperature coefficient (PTC) sensor in which the resistance increases as the temperature rises. The temperature sensor 136 is in electrical communication with the ECM 110, and may transmit and provide information and/or signals indicative of the engine temperature to the ECM 110 according to a variety of methods, including but not limited to in response to a poll from the ECM 110, based on a preconfigured time schedule, and when a preconfigured temperature threshold or value is achieved. Preferably, the engine temperature information is transmitted to the ECM 110 on a consistent or recurring basis during operation of the vessel 10. In at least one embodiment of the system 100, the engine temperature information is provided by the temperature sensor 136 when polled from the ECM 110.

The engine(s) 130 may also include at least one fault sensor 138 configured to detect at least one fault occurrence in the engine 130 operation, such as in the event of a malfunction of one of the operative components of engine 130. For instance, the fault sensor 138 may detect when an electrical circuit unexpectedly goes to ground, thereby interrupting the circuit. In another example, the fault sensor 138 may detect the occurrence of a cylinder firing improperly or at the wrong time. These are merely illustrative examples, and are not intended to be limiting. The fault sensor(s) 138 may therefore be any suitable sensor capable of detecting fault occurrences in an engine and/or electrical system, and may be electrical or mechanical in nature. Any of the other sensors discussed herein may also act as a fault sensor 138, detecting and reporting a fault occurrence if certain preconfigured parameters are exceeded. For instance, the temperature sensor 136 may act as a fault sensor 138 if it detects a temperature that exceeds a maximum operative temperature for the engine. Regardless of the cause, and whether the fault detection is a primary or secondary function of the sensor, when the fault sensor 138 detects the occurrence of a fault, a signal may be sent to the ECM 110 indicating the occurrence of the fault. A further signal may be provided to the dash 12, illuminating a "check engine" light or indicator on the dashboard that is viewable to the operator of the vessel 10. The illumination of a "check engine" light may also correspond to signal being sent to the ECM 110 that the "check engine" light is on.

In at least one embodiment, as shown in FIG. 1, the vessel 10 includes a transmission 140 operative to put the vessel 10 into gear (forward or reverse) or neutral, and to control the ratio between the engine speed and propeller speed. With marine transmissions 140, there may be only one gear and the direction of rotation of the trigger wheel within the transmission 140 corresponds to the direction of the vessel 10, such as forward for clockwise rotation of the trigger wheel and reverse for counterclockwise rotation of the trigger wheel. It can therefore be said that marine transmissions 140 have a single gear ratio. However, in certain embodiments the transmission 140 may be a multiple gear ratio transmission. The transmission 140 may include a transmission sensor 144 in proximity to the trigger wheel and/or gears and detecting the speed and/or direction of rotation of the trigger wheel or gears. When multiple gears are present in the transmission 140, each gear may have its own corresponding transmission sensor 144. The transmission sensor 144 may be any suitable type of sensor, such as but not limited to Hall effect, differential, inductive, active, analog or digital sensors. The transmission sensor 144 detects the input, output or intermediate speed of the transmission 140, such as based on the movement of the trigger wheel and/or gears. The transmission 140 and the transmission sensor(s) 144 are in electrical communication with the ECM 110 and can send and receive signals to and from the ECM 110 for operation of the transmission 140 and the system 100. For instance, the ECM 110 may send signals to the transmission 140, such as through solenoids 142, to shift the vessel 10 into gear, resulting in the trigger wheel or gears turning in a particular direction. Similarly, the transmission sensor 144 may provide informational status on the speed of the trigger wheel and/or gear, and therefore transmission 140. Such information may be provided on a scheduled basis, on reaching a predefined threshold, when polled by the ECM 110, and any other suitable time.

Figure 5:
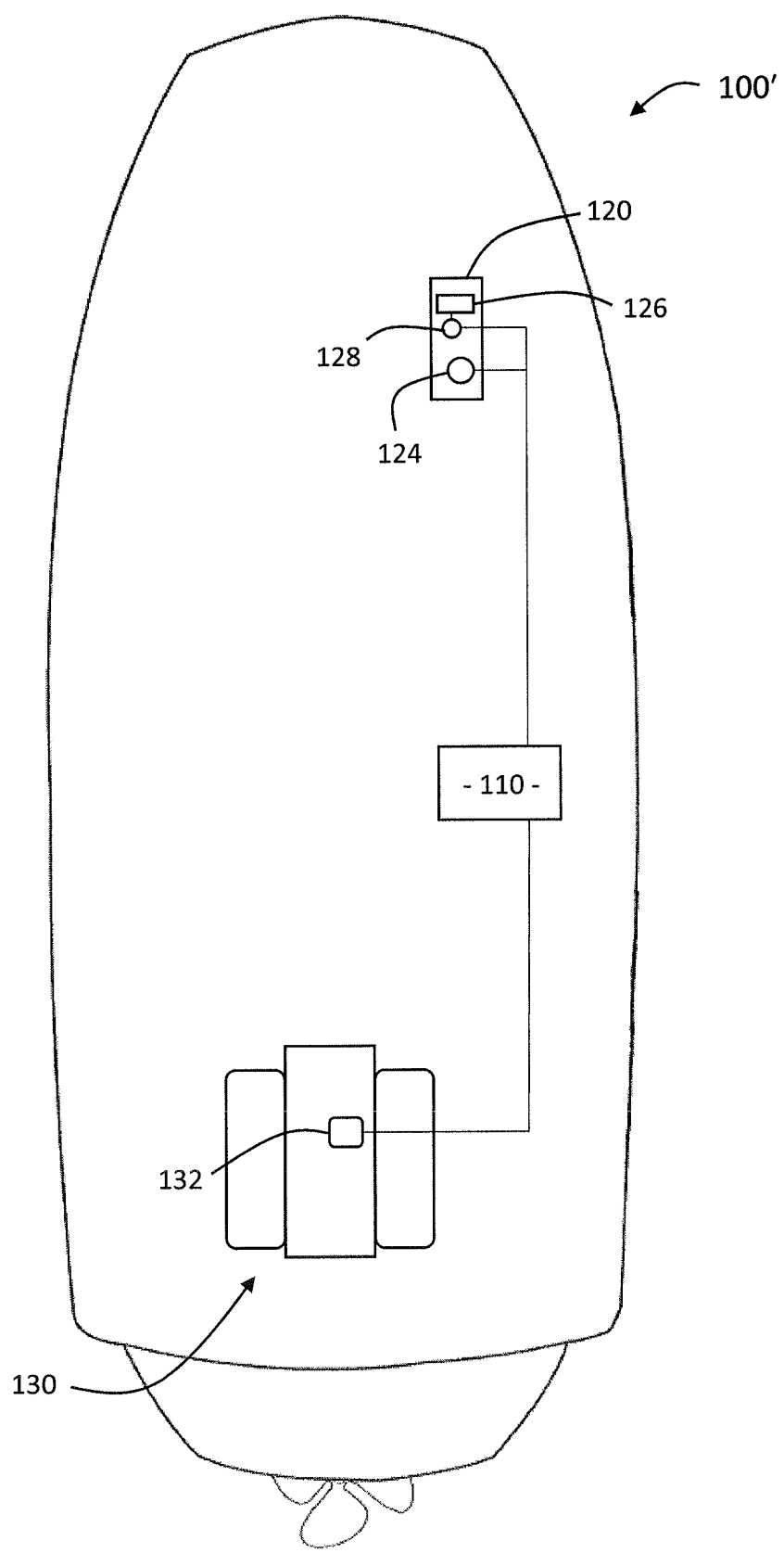
FIG. 5 is a schematic diagram of another embodiment of the present system for controlling automatic start and stop of an engine that may be used without a transmission.

In certain embodiments, such as depicted in FIG. 5, the system 100' may not include a transmission 140, such as with a direct-drive outboard engine(s) on a sailboat that provides propulsion in only one direction, for example. In such embodiments, the engine 130 is simply running or not running, and direction of movement is determined by the rudder, propeller and other components. When the handle 120 is in a neutral position 160 in an electrical transmission-less system 100', no current is being provided to the motor so there is no propulsion. As the handle 120 is moved, a potentiometer connected to the handle 120 is also moved to variably adjust the amount of current being provided to the motor, which drives the propulsion proportionally. The polarity of the current determines the direction of the propulsion as forward or reverse. In an internal combustion transmission-less system 100', the engine is off when the handle 120 is in a neutral position 160. When the handle 120 is moved out of neutral 160, however, a signal is sent to start the engine. As the handle moves past predetermined points such as may correspond with an idle position 162, 164, the engine speed is increased when the handle 120 is moved in a direction away from neutral 160 and reduced when the handle 120 is moved in a direction toward neutral 160.

Referring again to FIG. 1, the vessel 10 also preferably includes at least one battery 150, such as a starter battery and/or deep cycle batteries, that is in electrical communication with the ECM 110 and the engine 130. In some embodiments, the battery 150 may include a battery sensor 152 that provides battery status, such as voltage contained therein, to the ECM 110, though in other embodiments the battery 150 may provide voltage status directly to the ECM 110. This may occur in response to a poll from the ECM 110, based on a preconfigured time schedule, or when a preconfigured voltage level is achieved, to name a few illustrative examples. In at least one embodiment, a fully charged marine vessel battery 150 may have 12 volts, although other voltages are also contemplated herein. The batteries 150 may be any type of battery with any type of battery chemistry suitable for use such as with a marine engine 130, including but not limited to lead-acid, lead-calcium, lithium, cobalt, nickel, manganese, thin plate, flooded, gel, and absorbed glass mat (AGM). Moreover, each battery 150 in the vessel 10 may be electrically connected to the ECM 110 and may provide individual battery voltage information to the ECM 110.

The system 100 may also include a vessel speed sensor 112 configured to detect the speed at which the vessel 10 is traveling. The vessel speed sensor 112 may be any suitable sensor capable of providing speed information, and may be located or positioned wherever such information may be detected. For instance, in at least one embodiment the vessel speed sensor 112 is located at the dash 12, or may be presented at the dash 12 to an operator, and may report the vessel 10 in appropriate units of speed, such as but not limited to miles per hour (mph) or knots. For instance, in at least one embodiment the vessel speed sensor 112 may be a speedometer, such as an electromagnetic speed sensor. In some embodiments, the vessel speed sensor 112 may be a pitometer located in the hull of a marine vessel in fluid communication with the water or fluid the vessel 10 is moving through. A pitometer determines the speed of the marine vessel in relation to the speed of the fluid through which it moves, and may do so from calculations based on measurements of the speed and pressure of the fluid moving through the pitometer. In other embodiments, the vessel speed sensor 112 may be the impellor log of a marine vessel, providing speed information based on how fast the surround fluid is moved through the propeller as the vessel 10 moves. Therefore, the vessel speed sensor 112 may be located in proximity to one or more propellers of the vessel 10. In still other embodiments, the vessel speed sensor 112 may be the global positioning system (GPS) onboard the vessel 10, which may determine vehicle speed by coordinating land position information from satellites. Accordingly, the vessel speed sensor 112 may be located in the ECM 110 and may include circuitry to calculate or determine the vessel speed based on information. Regardless of the type of sensor, the vessel speed sensor 112 is in electrical communication with the ECM 110, and may transmit vessel speed information to the ECM 110 according to a variety of methods, including but not limited to in response to a poll from the ECM 110, based on a preconfigured time schedule, and when a preconfigured speed threshold or value is achieved.

The system 100 may further include a shutdown timer 114 for optional use in the shutdown procedure for the engine 130. Accordingly, the timer 114 may be included as a program or circuitry in the ECM 110 that counts a time delay before which certain further action may occur. The timer 114 may count down or count up by a preset or preconfigured amount of time, which may be in the range of milliseconds, seconds, or minutes. For instance, in some embodiments the time delay is in the range of 1 millisecond to 30 minutes. In at least one preferred embodiment, the time delay is in the range of 3-10 seconds. In other embodiments, the time delay is 5 seconds.

Figure 3:
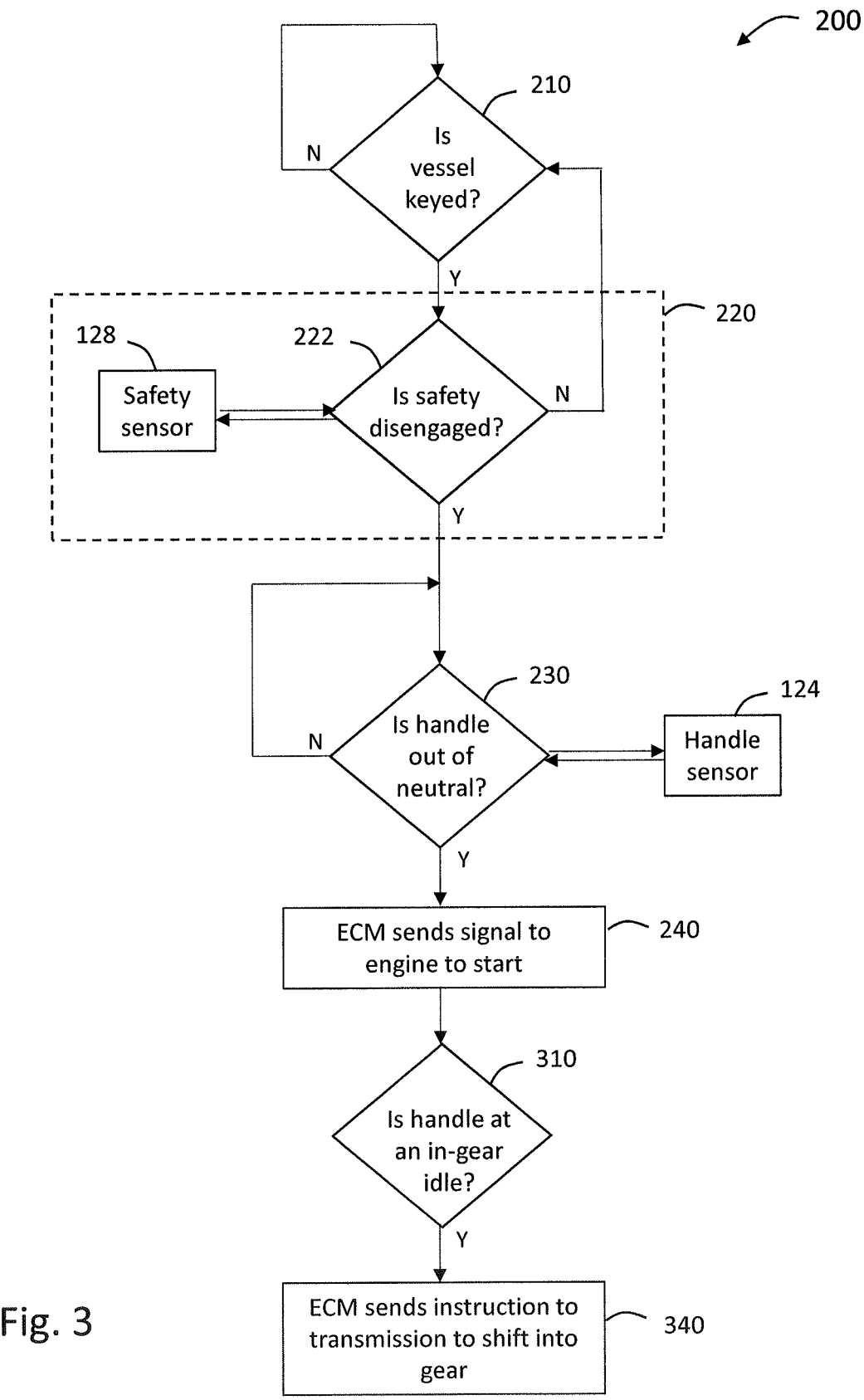
FIG. 3 is a flow diagram of the steps performed by the system of the present invention to automatically start the engine without engine flare.
Figure 4:
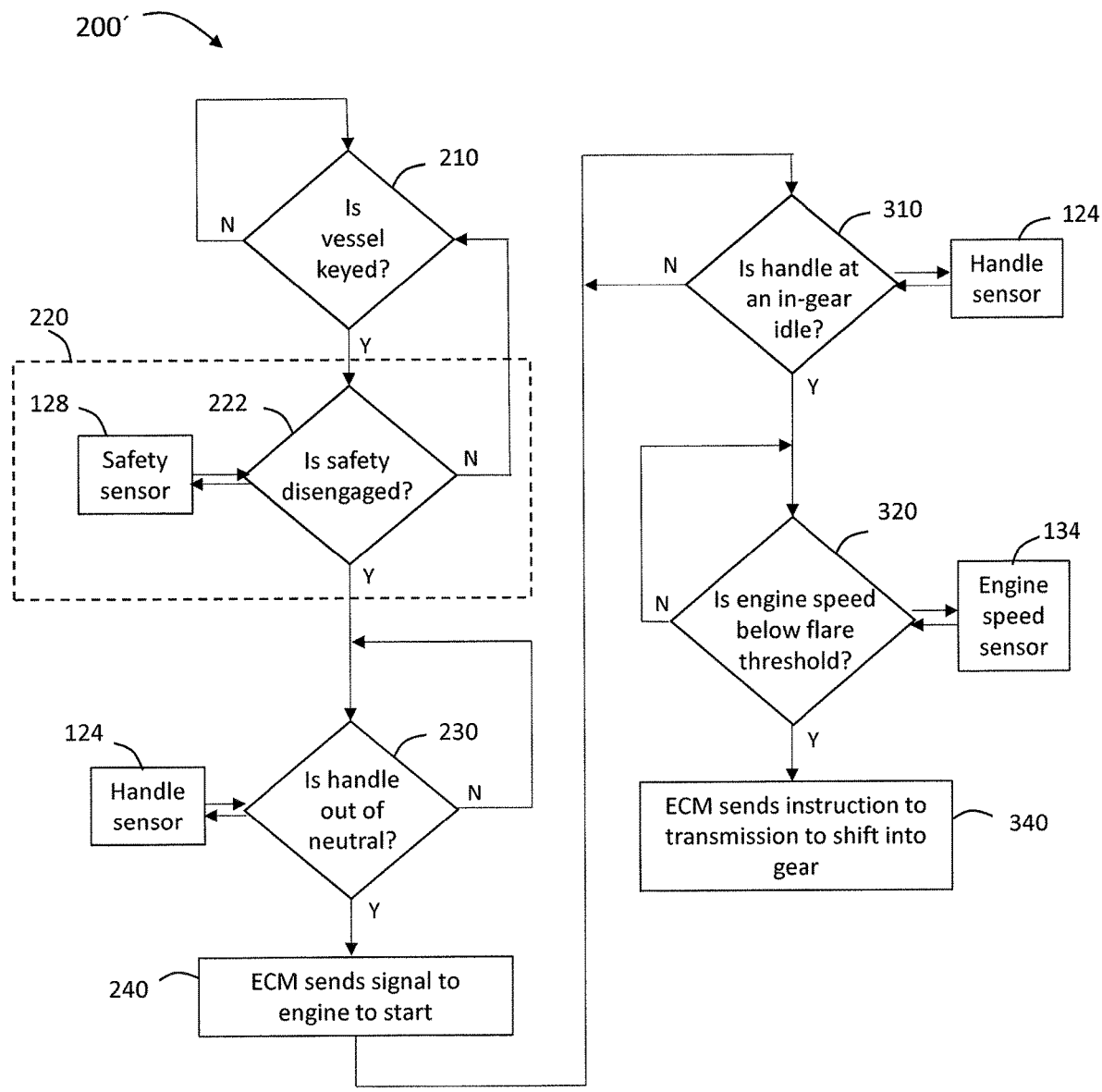
FIG. 4 is a flow diagram of another embodiment of the steps performed by the system of the present invention to automatically start the engine when engine flare is present.

The system 100, 100' as described above is configured to control the automatic starting and stopping of the engine(s) 130 based on the movement of the handle 120 into and out of neutral. For instance, FIGS. 3 and 4 depict the automatic start process 200, 200' for starting the engine(s) 130 employed by the present system 100, 100'. First, the ECM 110 determines whether the vessel is keyed, as at 210. The vessel 10 is keyed when it is sufficiently electrically primed for activation of the various components. The vessel 10 may be keyed up by activating the initializer 14 at least once, and preferably more than once. Pressing, touching or otherwise actuating the initializer 14 electrically activates the various circuits, such as but not limited to the display circuitry that controls the lights and the dashboard 12 illumination, as well as the ignition circuit that primes the ignition for a cold-start of the engine 130, such as with 12 volts of power for ignition. For instance, in one embodiment a first press or activation initiates electrical activation of the display circuit for lights and the dashboard 12, and a second press of the initializer 14 electrically activates the ignition circuit. Activation of the various circuits may occur in any order, including simultaneously. In some embodiments, actuating the initializer 14 multiple times may be required as a safety measure, such that only pressing the initializer 14 once within a predefined limited period of time, such as but not limited to three seconds, is insufficient to prime all the required circuitry. Further, the ECM 110 will not permit the automatic starting of the engine 130 even if the other requirements are met. This prevents accidental starts and is a safety measure. Regardless of the number of times the initializer 14 may be pressed, even when the various circuitry is activated and "primed," the engine has not yet started and is still off. The ECM 110 may poll the various electrical systems of the vessel 10 to determine whether each is primed and ready for action.

Once the vessel is keyed, as at 210, the ECM 110 may perform an optional step of checking the safety mechanism, as at 220. In some embodiments, the handle 120 may include a safety mechanism 126 as described above. When a safety mechanism 126 is present, the automatic start process 200 may include the ECM 110 querying whether the safety is disengaged, as at 222. This may include polling the safety sensor 128, or may be indicated simply by movement of the handle 120 in embodiments lacking a safety sensor 128. The safety mechanism 126 may be disengaged by removing the lock or impediment to movement applied to the handle 120. For instance, in at least one embodiment, disengaging the safety may involve lifting an umbrella switch as described above. In other embodiments, the safety mechanism 126 may be disengaged by selecting an appropriate icon on a display at the dash 12. If the safety is disengaged, as at 222, then the process proceeds. If not, the system 100, 100' may continue the process as shown in FIG. 3 until the safety is disengaged.

The automatic start process 200, 200' continues with the ECM 110 querying whether the handle 120 is out of neutral, as at 230. Movement of the handle 120 may be determined by the ECM 110 polling the handle sensor 124 or by receiving positional information from the handle sensor 124. At a minimum, the handle sensor 124 provides information of whether the handle 120 is in neutral 160 or is out of neutral 160. The handle sensor 124 may also provide additional information, such as handle 120 position in one of the other positions 162, 164, 166, 168 or at some other location along its range of motion. Movement of the handle 120 out of the neutral position 160, in any direction and by any amount, permits the ECM 110 to send a signal to the engine 130 to start, as at 240. For instance, in at least one embodiment the ECM 110 sends operative instructions or signals to the starter 132 of the engine 130, which may in turn initiate spark plugs and/or the fuel injector to begin the combustion process for engine start. In other embodiments, however, the engine 130 may start or crank without a starter. In such embodiments, the starter 132 which receives the initialize instructions from the ECM 110 may be any suitable component capable of initiating engine start, such as a fuel injector or spark plug.

If the handle 120 is in neutral 160 while the engine is off, no signal is sent to the engine 130 and the engine 130 remains off. Accordingly, the movement of the handle 120 out of neutral 160 is the determining factor that initiates automatic cranking of the engine 130. This is contrary to other start systems, which expressly require the handle to be in the neutral position for the engine to start, including as described in U.S. Pat. No. 8,406,944 to Garon.

In some embodiments, as shown in FIG. 5, the system 100' may lack a transmission. Accordingly, movement of the handle 120 out of neutral 160 starts the engine 130 and no further action is needed. In other embodiments, as in FIG. 1, the system 100 includes a transmission 120 which is shifted into gear after starting the engine 130. As shown in FIG. 3, the automatic start process 200 may further include shifting the transmission into gear. Specifically, once the handle 120 is out of neutral 160 and the signal has been sent to the engine to start, the ECM 110 then queries whether the handle is at an in-gear idle, as at 310. This may be either the forward idle 162 or reverse idle 164 positions, or at some other position such as in the case of a joystick with greater degrees of movement. Whether the handle is at idle, as at 310, may be determined in some embodiments by the ECM 110 polling the handle sensor(s) 124 for positional information of the handle 120. As described above, there may be various handle sensor(s) 124 in connection with the handle assembly 122 or in proximity to the handle 120 at various positions along the range of motion of the handle 120. Any or all of such sensors 124 may be polled by the ECM 110. In response to the polling signals, or by independent reporting, the handle sensor(s) 124 may provide information on the position of the handle 120.

When the handle 120 reaches one of the in-gear idle positions 162, 164, the ECM 110 will want to shift the transmission 140 into gear. In certain embodiments, as in FIG. 3 which may be used with outboard motors, the handle sensor 124 sends a signal to the ECM 110 when the handle 120 reaches one of the idle positions 162, 164. When the ECM 110 receives this signal, it in turn sends a signal to the transmission 140 to shift into gear. For instance, the ECM 110 may send a signal to the transmission solenoid that causes the transmission to shift into gear. The signal sent to the transmission may also include further instructions, such as the direction for movement to forward or reverse.

In certain other embodiments, such as in FIG. 4, the process 200' includes first determining if the engine speed is below a preconfigured flare threshold, as at 320. It is understood that marine engines utilize a flare procedure upon starting to clear the exhaust system of water. This may be accomplished, for instance, by the starter 132 spinning the engine 130 at an initial speed, such as 200-400 rpm, and then the engine increase the speed once cylinders begin to fire to a higher amount, such as 1500-3000 rpm, to "flare" the engine 130. Governors for air, fuel and spark collectively coordinate to regulate engine operation and reduce the engine speed once the flare has occurred, which may occur according to a fueling table(s). The engine flare creates a pressure spike in the exhaust system of a magnitude sufficient to quickly expel any water that may be residing in the exhaust system or muffler, which are often at least partially submerged in watercraft. Expulsion of the water from the exhaust system is important to prevent reversion of water into the engine 130, which could damage the engine 130. The magnitude and timing of the engine flare may be calibrated or preconfigured depending on the type, number and placement of engines 130 in the vessel 10. The flare magnitude begins at the flare threshold, which is the lowest speed at which the flare is considered to occur, and continues through the highest speed reached during the flare. For instance, the engine flare may last from 2-5 seconds, and may have a magnitude of 850-10,000 rpm, where the flare threshold is 650 rpm. In at least one embodiment, the engine flare is 2-3 seconds and has a flare threshold of 2000 rpm.

Once the exhaust system is cleared by the engine flare, the engine speed is reduced to a normal running speed, and the engine 130 begins turning the motor. Until the engine flare is complete, it is not safe for the transmission 120 to shift into gear. Therefore, the engine speed sensor 134 must report an engine speed below the flare threshold to proceed with the shifting process 300. The engine speed sensor 134 may provide this information as it occurs, or may provide it in response to a poll from the ECM 110. Once the handle 120 is reported as in idle 162, 164 and the engine speed is below the flare threshold, then the ECM 110 sends a signal to the transmission to shift, as at 340. This signal may be sent to the solenoid 142 of the transmission 144, which in turn directs fluid flow and pressure to activate the clutches, such as may be indicated in the instructions from the ECM 110. Accordingly, the instructions from the ECM 110 may include not only to shift into gear, but to do so in the forward or reverse directions, as may be informed by and correspond to the handle position information from the handle sensor(s) 124.

If, however, the engine speed is still above the flare threshold when the handle 120 reaches the idle position 162, 164, the ECM 110 continues polling the engine speed sensor 134. No signal is sent to the transmission 140 and no shift occurs. The operator of the vessel 10 may return the handle 120 to the neutral position 160 and then back to the forward or reverse idle positions 162, 164 to continue the process. In this case, the engine 130 has already started. The transmission shifting process is resumed once the handle 120 is again reported as being at an in-gear idle position, as at 310.

The system 100, 100' is also configured to automatically stop an engine, such as a marine or marinized engine 130, based at least on the position of the handle 120. In some embodiments, a plurality of other factors must also be met as safety conditions in order to initiate automatic stop of the engine, to prevent stopping of the engine by accident or when actual conditions are inappropriate for stopping (such as during movement of the vessel). Embodiments of the automatic stop processes 400, 400' are depicted schematically in FIGS. 6 and 7A-7B.

Figure 6:
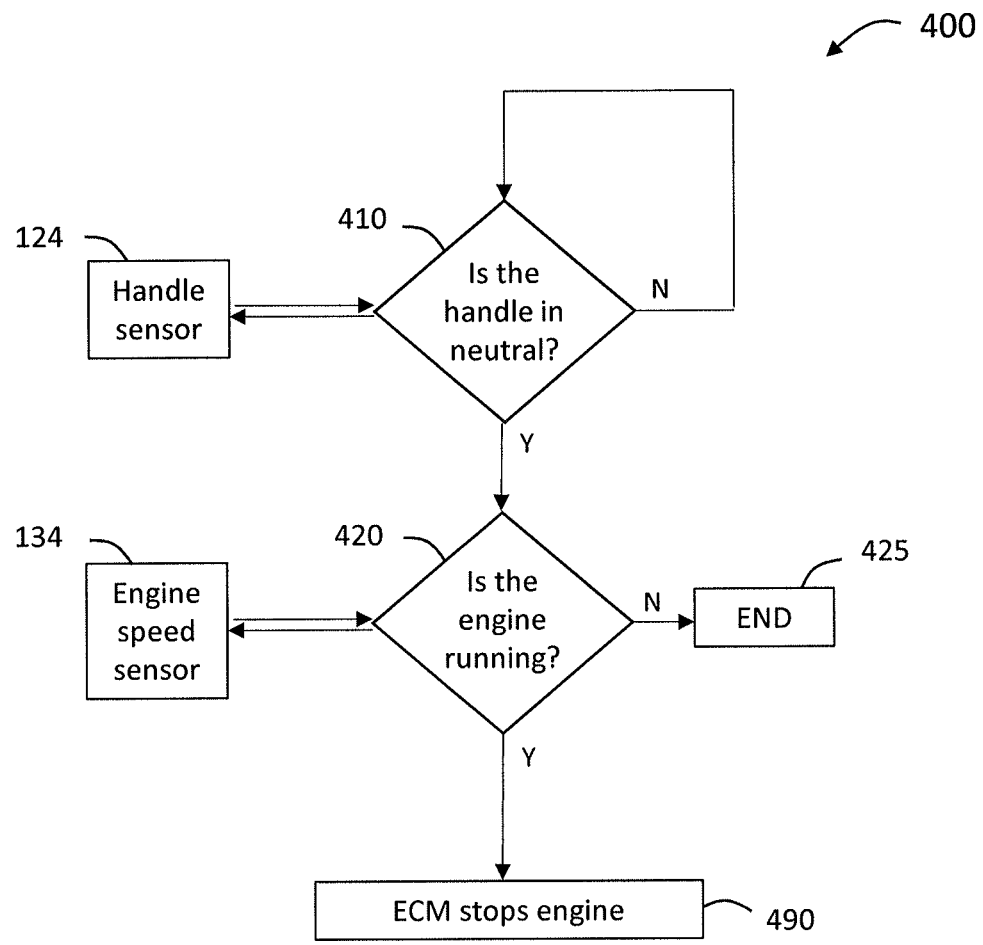
FIG. 6 is a flow diagram of one embodiment of steps performed by the system of the present invention to automatically stop the engine.

In at least one embodiment as shown in FIG. 6, the automatic stop process 400 includes the first step of querying whether the handle is in neutral, as at 410. For instance, when the handle 120 is moved from any position other than neutral (such as forward or reverse idle 162, 164 or forward or reverse WOT 166, 168 or anywhere in between) into the neutral position 160 while the engine is running, a signal may be sent from the handle sensor(s) 124 to the ECM 110 notifying the ECM 110 that the handle 120 is in neutral 160. In other embodiments, the ECM 110 may poll the handle sensor(s) 124 for handle position during operation of the vessel 10, which may occur on a preconfigured loop, as seen in FIG. 6. In some embodiments, the safety mechanism 126 at the handle 120 may also lock into place, and the safety sensor 128 may provide a signal to the ECM 110 of the locked status of the safety mechanism 126, which for instance may only occur in the neutral position 160.

When the handle registers in the neutral position, as at 410, the ECM 110 may then poll the engine speed sensor 134 to confirm whether the engine is running, as at 420. If it is, then the ECM 110 may stop the engine, as at 490 described below. If the engine 130 is not running, then nothing further happens, as at 425, since the engine 130 is already off.

The ECM 110 may control the shutdown of the engine, as at 490, in several ways. For instance, in one embodiment the ECM 110 may send a signal to the engine 130 to turn off. Such a signal may be affirmative instructions sent to a component(s) of the engine, such as but not limited to the fuel injector to stop injecting fuel, to the spark plugs to stop sparking, or to the intake valve to close on intake, thereby drawing a vacuum on the next revolution. In at least one embodiment, the ECM 110 stops the engine, as at 490, by simply stopping an operational or run loop, thereby ceasing to send operative signals to the engine 130. For instance, the engine 130 may continue running as long as an engine operation loop is followed in the ECM 110. Such a loop may include a programmed loop of commands that occur within the ECM 110 and are sent to the engine 130 with each revolution of the engine, such as but not limited to commands to fire particular spark plugs, open particular fuel valves, inject fuel through the open valve, and ignite the fuel at a particular piston or cylinder. When the ECM 110 determines conditions are appropriate to stop the engine, as described in processes 400, 400', the ECM 110 may simply stop the engine operation loop within its circuitry. With this, no further commands will be issued to the engine 130 for operation. When the next engine revolution occurs, there are no further instructions to fire the spark plugs, inject fuel, or ignite the fuel for the next piston. Lacking any commands, the components of the engine 130 will take no further action. Friction takes over and the engine speed eventually slows to zero. In other embodiments, the ECM 110 may stop the engine, as at 490, by issuing an affirmative instruction to the engine 130 or a component thereof to stop operation.

Figure 7A:
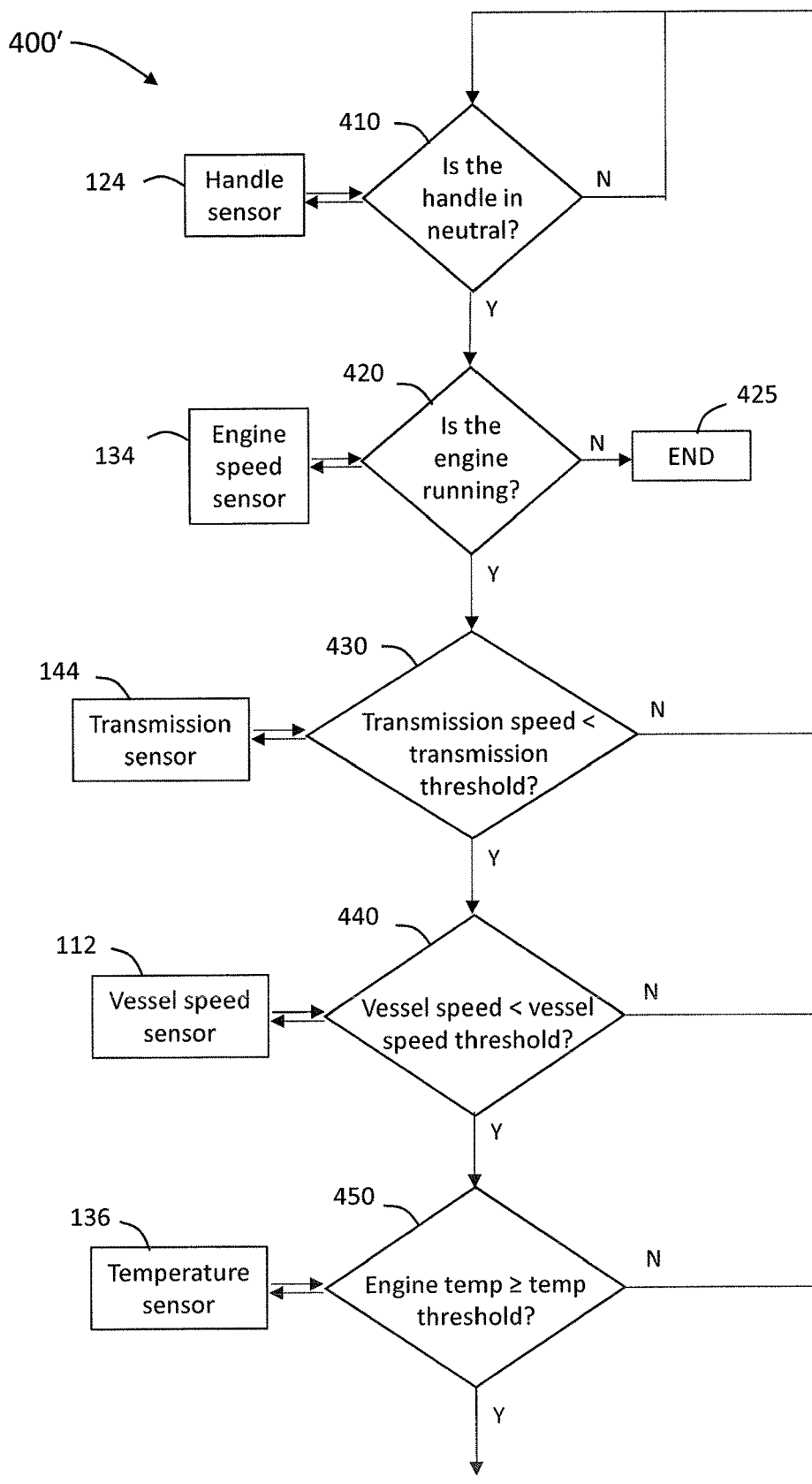
FIG. 7A is a first half of a flow diagram of another embodiment of steps performed by the system to automatically stop the engine, which is continued in FIG. 7B.
Figure 7B:
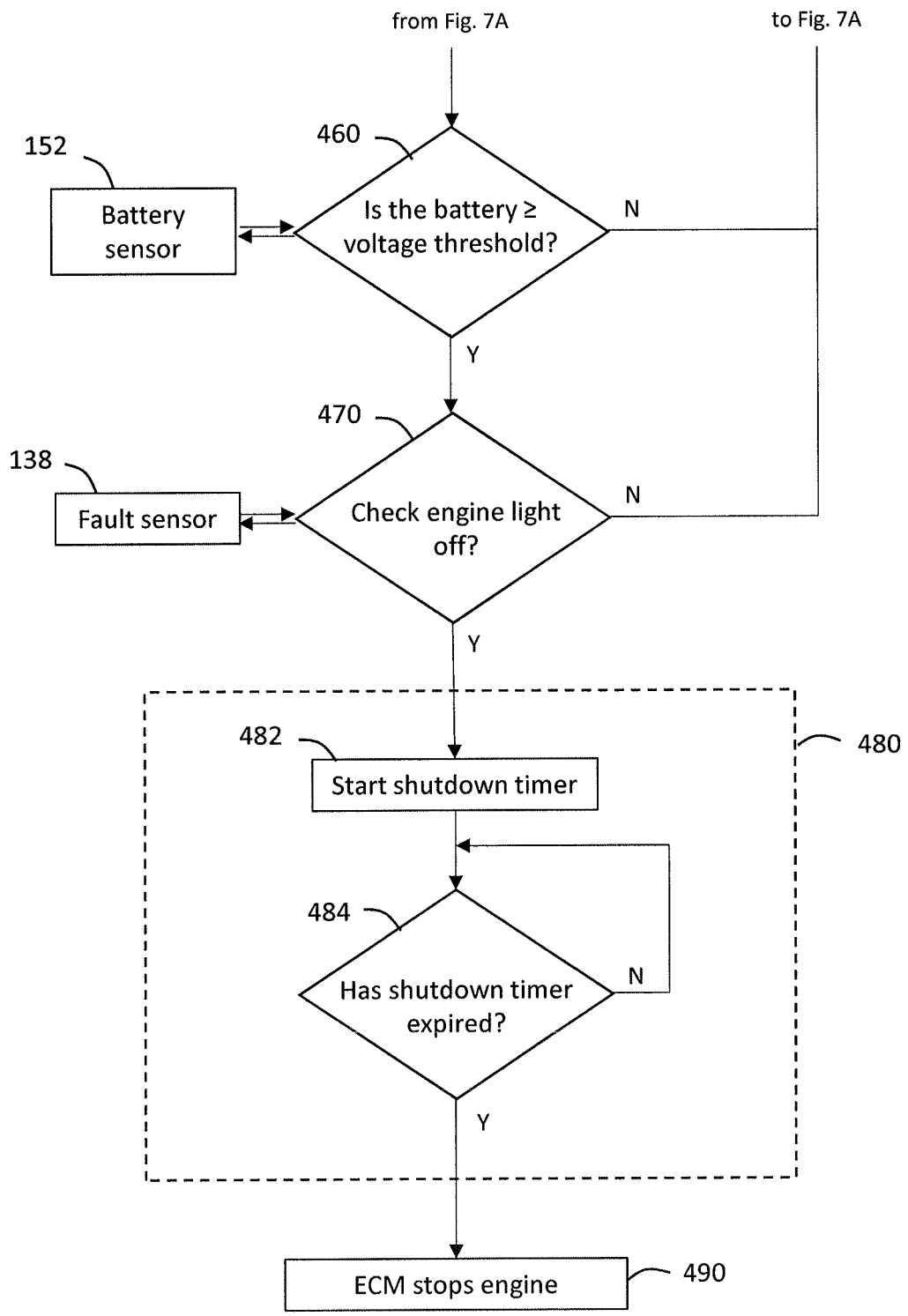
FIG. 7B is the second half of the flow diagram of FIG. 7A.

In another embodiment of the automatic stop process 400', shown in FIGS. 7A-7B, the process begins the same way by querying whether the handle is in neutral, as at 410. Here again, the position of the handle 120 initiates the automatic stop process 400'. Determining whether the handle is in neutral, as at 410, may occur by transmission of a signal from the handle sensor(s) 124 to the ECM 110 upon a preconfigured schedule or the occurrence of sensing the event, or in response to a poll from the ECM 110. If the handle 120 in a position other than neutral, the ECM 110 continues polling for the presence of the handle 120 at neutral. When the handle is at neutral, as a 410, the ECM 110 checks to see if the engine is running, as at 420. As before, this may occur by polling the engine speed sensor 134. If the engine is running, as at 420, then certain of the following conditions must also be true for the automatic shut-down of the engine to proceed. In some embodiments, at least one of the following conditions must also be true. In other embodiments, each of the following conditions must be true for automatic shut-down of the engine. The ECM 110 may be configured to require any or all of the following conditions to trigger the automatic shut-down of the engine.

First, the ECM 110 polls the transmission sensor 144 for the speed of the transmission 140. The ECM 110 then compares the transmission speed to a preconfigured transmission threshold to determine if the transmission speed is less than the transmission threshold, as at 430. The transmission threshold may be preconfigured or calibrated to a set value which indicates the trigger wheel of the transmission is not spinning, or if spinning it is at such a slow speed that the direction of spin cannot be determined. A transmission speed less than the transmission threshold confirms the transmission is not in gear, which corresponds to the handle 120 being positioned in neutral 160. For instance, in some embodiments the transmission threshold may be preconfigured to be in the range of 0-100 rpm. In at least one embodiment, the transmission threshold is in the range of 0-10 rpm. If the transmission speed is below the preselected transmission threshold, the process 400' proceeds.

The process 400' also includes the step of checking to see if the vessel speed is below a vessel speed threshold, as at 440. This step ensures the engine 130 is not shut off while the vessel 10 is in motion. However, because the vessel 10 may drift with the current of water or the wind, it may not necessarily be entirely immobile when stopped, so the vessel speed threshold may be configured to take such small movements into account. Similarly, it may be desirable for the engine 130 to continue operating at very low speeds, such as to maneuver to a person in the water, until the vessel 10 is sufficiently close to the person to pick them up. Accordingly, in at least one embodiment the vessel speed threshold may be configured to be in the range of 0-1 mph. In some embodiments the vessel speed threshold is configured to be 0.3 mph. The ECM 110 may poll the vessel speed sensor 112 for the current speed of the vessel 10, compare it to the preconfigured vessel threshold, and continue the process 400' when the vessel speed drops below the vessel speed threshold.

The process 400' may also include the step of determining whether the engine temperature is at or above a temperature threshold, as at 450. This step ensures the vessel 10 is currently or has been in motion recently, and therefore that the engine(s) 130 has been is sufficiently warmed and lubricated to enable a subsequent automatic restart. In some embodiments, the temperature threshold may correspond to the operating temperature of the engine(s) 130. The temperature threshold may be preset or preconfigured depending on the type of engine(s) 130 or thermostat used in the vessel 10 and if antifreeze is used. For instance, in at least one embodiment the temperature threshold may be in the range of 140° F.-220° F., where engine(s) 130 including antifreeze would require a higher temperature threshold. In certain embodiments, the temperature threshold may be in the range of 140° F.-170° F. Accordingly, the ECM 110 may poll the temperature sensor 136 for the current engine temperature, and then compare the current reading to the temperature threshold. When the current engine temperature is at or above the temperature threshold, as at 450, the process 400' continues.

Continuing to FIG. 7B, the process 400' may also include the step of determining if the battery holds at least as much voltage as the voltage threshold, as at 460. This step ensures there is sufficient charge in the battery 150 for a subsequent engine start. Accordingly, the voltage threshold may be preconfigured to correspond to an amount necessary for an engine start, and may depend on the type and capacity of the battery 150. In at least one embodiment, the voltage threshold may be in the range of 12-15 volts. In some embodiments, the voltage threshold may be 12.5 volts. The ECM 110 may poll or otherwise receive voltage information from the battery sensor 152, compare the current battery voltage to the voltage threshold, and proceed with the process 400' when the current battery voltage meets or exceeds the voltage threshold, as at 460.

The process 400' may also include the step of confirming that the check engine light is off, as at 470. A check engine light may illuminate at the dash 12 or otherwise register when a fault sensor 138 is tripped, as discussed above, which may also be reported to the ECM 110 upon occurrence. The ECM 110 may also poll the fault sensor 138 to confirm that it has not detected the presence of a fault that would render the check engine light on. This step ensures there is not some problem with the engine(s) 130 that could impair its ability to restart. If there are no check engine lights on, as at 470, the automatic stop process 400' may proceed.

If at any time any of the steps of 430, 440, 450, 460, and 470 are not true, or cease to be true, the process 400' begins again with checking to see if the handle is in neutral, as at 410. Only when all of these steps are true does the process 400' proceed. Further, some embodiments may require all or some of the steps 430, 440, 450, 460 and 470. All of those that are included in the process 400' must be true for the process 400' to continue.

Figure 8:
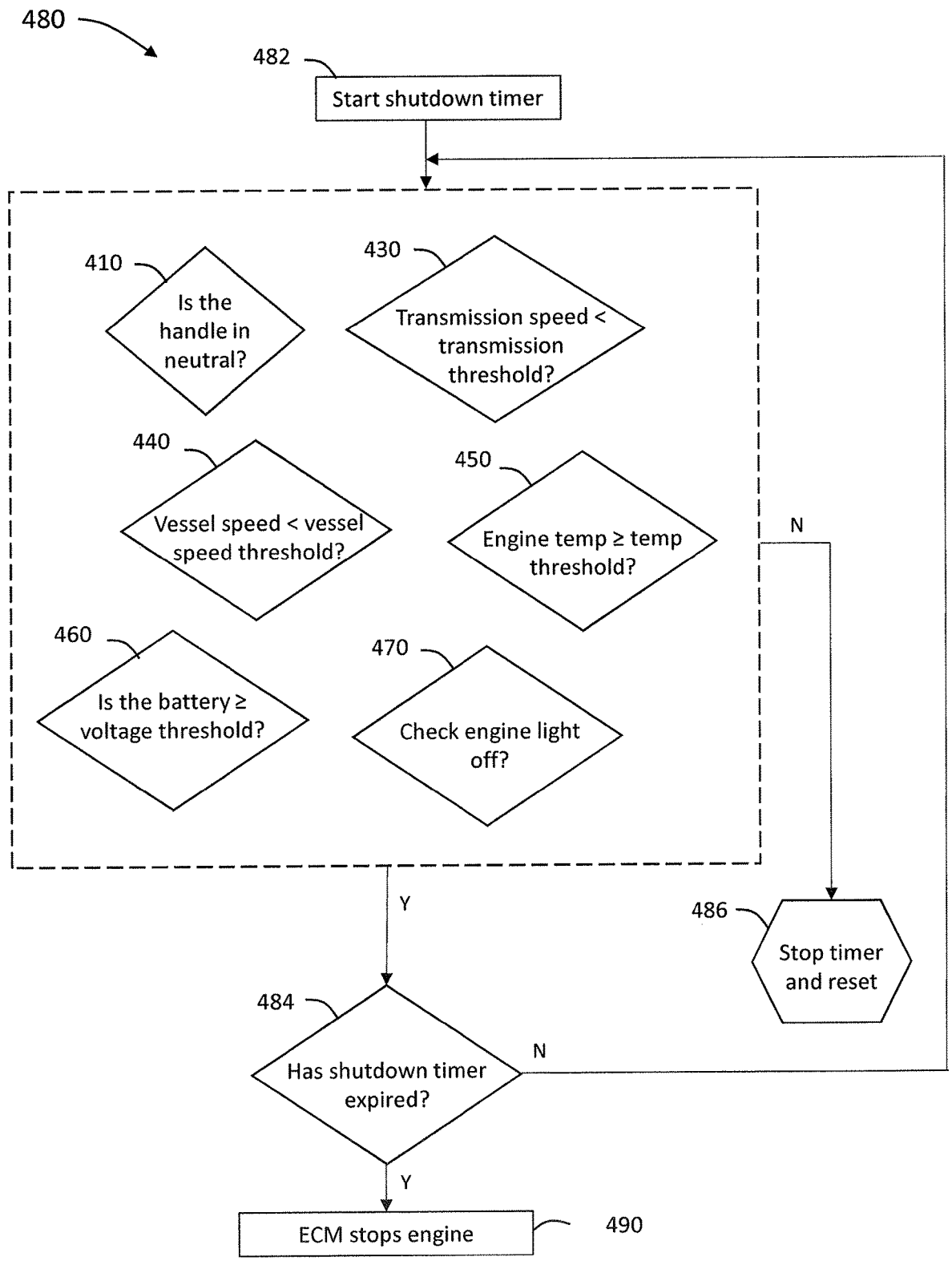
FIG. 8 is a flow diagram of the steps of the timer step.

In some embodiments, the process 400' includes an optional timer step 480. In this step, if all the above requirements are met, the ECM 110 starts a shutdown timer, as at 482. The timer 114 may be a part of the ECM 110 itself, as described above. When the timer expires, as at 484, either from counting up or counting down, then process 400' continues with the ECM 110 automatically shutting down the engine(s), as at 490. This may occur as described above with respect to the process 400. As shown in FIG. 8, if at any time during the timer countdown any of the steps of 430, 440, 450, 460, and 470 ceases to be true, the timer 114 may stop and reset, and the process 400' begins again. The engine 130 remains running unless the process 400, 400' is completed.

Since many modifications, variations and changes in detail can be made to the described preferred embodiments, it is intended that all matters in the foregoing description and shown in the accompanying drawings be interpreted as illustrative and not in a limiting sense. Thus, the scope of the invention should be determined by the appended claims and their legal equivalents. Now that the invention has been described,

What is claimed is:

1. A system for controlling an engine, said system comprising:
   a handle having a neutral position and at least one idle position, said handle actuatable by an operator into and out of said neutral position and said least one idle position;
   a handle sensor in proximity to said handle and providing signals indicative of a position of said handle;
   a transmission;
   an electronic control module in electronic communication with said handle sensor, said transmission, and said engine, said electronic control module configured to:
   (i) receive signals indicative of the position of said handle from said handle sensor;
   (ii) provide a signal to said engine to start upon receiving a signal from said handle sensor indicating said handle has moved out of said neutral position; and
   (iii) provide a signal to said transmission to shift into gear upon receiving a signal from said handle sensor indicating said handle has moved into said at least one idle position.

2. The system as recited in claim 1, further comprising an engine speed sensor in proximity to said engine and capable of detecting and communicating an engine speed, said electronic control module in electronic communication with said engine speed sensor and further configured to:
   (i) request engine speed from said engine speed sensor upon receiving a signal from said handle sensor indicating said handle has reached said at least one idle position;
   (ii) compare said engine speed to a predefined flare threshold; and
   (iii) provide a signal to said transmission to shift into gear if said engine speed is below said predefined flare threshold.

3. The system as recited in claim 2, wherein said predefined flare threshold is in the range of 650-5000 rpm.

4. The system as recited in claim 1, wherein handle is at least one of a throttle handle, joystick, button, and digital display.

5. The system as recited in claim 1, further comprising a safety mechanism associated with said handle and restricting movement of said handle with respect to said neutral position.

6. The system as recited in claim 5, further comprising a safety sensor in proximity to said safety mechanism and in electronic communication with said electronic control module, said safety sensor providing signals indicative of the status of said safety mechanism to said electronic control module, wherein said electronic control module provides a signal to said engine to start only when said status of said safety mechanism is disengaged.

7. The system as recited in claim 1, further comprising an initializer actuatable to initiate electronic circuitry for at least one of display circuitry and ignition circuitry associated with said electronic control module.

8. The system as recited in claim 1, further comprising:
   a transmission sensor in proximity to a transmission and detecting a transmission speed;

a vessel speed sensor configured to detect a vessel speed;
an engine temperature sensor in proximity to said engine and detecting a temperature of said engine; and
a battery configured to receive, retain and discharge voltage;
wherein said electronic control module is further in electronic communication with said transmission sensor, said vessel speed sensor, said engine temperature sensor and said battery, and said electronic control module is further configured to automatically stop said engine when:
(i) said electronic control module determines said transmission speed as detected by a transmission speed sensor is less than a preselected transmission threshold;
(ii) said electronic control module determines said vessel speed as detected by a vessel speed sensor is less than a preselected vessel speed threshold;
(iii) said electronic control module determines said temperature as detected by an engine temperature sensor is at least a preselected engine temperature threshold and less than a maximum operative engine temperature;
(iv) said electronic control module determines a voltage of said battery is at least a preselected voltage threshold and less than a maximum operative battery voltage; and
(v) said electronic control module confirms a lack of check engine light from said engine.

9. The system as recited in claim 8, wherein said preselected transmission threshold is in the range of 0-100 rpm.

10. The system as recited in claim 8, wherein said preselected vessel speed threshold is in the range of 0-1 mph.

11. The system as recited in claim 8, wherein said preselected engine temperature threshold is in the range of 140° F.-220° F.

12. The system as recited in claim 8, wherein said preselected voltage threshold is in the range of 12-15 volts.

13. The system as recited in claim 8, wherein said check engine light is configured to detect the presence of a fault in said engine.

14. The system as recited in claim 8, further comprising a shutdown timer configured to track a predefined time delay before said electronic control module automatically stops said engine and restarts said time delay when any requirement for automatically stopping said engine ceases to be true during said time delay.

15. The system as recited in claim 14, wherein said time delay is in the range of 3-10 seconds.

16. The system as recited in claim 1, further comprising a plurality of engines, said electronic control module configured to provide signals to each of said plurality of engines to start upon receiving a signal indicating said at least one handle has moved out of said neutral position.

17. The system as recited in claim 1, further comprising a plurality of engines, said electronic control module configured to provide a signal to a first one of said plurality of engines to start upon receiving a signal indicating said at least one handle has moved out of said neutral position, and a remainder of said plurality of engines are configured to mirror the actions of said first one of said plurality of engines.

18. The system as recited in claim 1, wherein said electronic control module is further configured to automatically stop said engine upon receiving a signal indicating said handle has moved into said neutral position.

* * * * *